(12) United States Patent
Cameron

(10) Patent No.: US 11,717,000 B2
(45) Date of Patent: *Aug. 8, 2023

(54) APPARATUS FOR TEARING MEAT

(71) Applicant: House of Raeford Farms, Inc., Rose Hill, NC (US)

(72) Inventor: Ronnie Cameron, Rose Hill, NC (US)

(73) Assignee: House of Raeford Farms, Inc., Rose Hill, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/576,523

(22) Filed: Jan. 14, 2022

(65) Prior Publication Data

US 2022/0132873 A1 May 5, 2022

Related U.S. Application Data

(63) Continuation of application No. 16/534,220, filed on Aug. 7, 2019, now Pat. No. 11,224,230.

(51) Int. Cl.
  *B02C 17/00* (2006.01)
  *A22C 17/00* (2006.01)
  (Continued)

(52) U.S. Cl.
  CPC .......... *A22C 17/0026* (2013.01); *B02C 13/06* (2013.01); *B02C 13/282* (2013.01);
  (Continued)

(58) Field of Classification Search
  CPC ............ B02C 2018/188; B02C 18/145; B02C 18/2291
  (Continued)

(56) References Cited

U.S. PATENT DOCUMENTS 2,261,090 A 10/1941 Lind
3,067,958 A 12/1962 Garwin
(Continued)

FOREIGN PATENT DOCUMENTS

CN 102429245 B 1/2014
CN 103535757 A 1/2014
(Continued)

OTHER PUBLICATIONS

Author Unknown, "Gluten-Free Rotisserie Style Shredded Chicken {Instant Pot or Slow Cooker, Dairy-Free}," Recipe, mamaknowsglutenfree.com/gluten-free-shredded-chicken/, Sep. 10, 2018, Wordpress, 17 pages.
(Continued)

*Primary Examiner* — Faye Francis
(74) *Attorney, Agent, or Firm* — Withrow & Terranova, PLLC; Vincent K. Gustafson

(57) ABSTRACT

An apparatus for tearing meat is disclosed. The apparatus includes a gravity-fed hopper including at least one sidewall that forms a first opening configured to receive meat articles and a second opening configured to discharge torn meat articles. The apparatus includes a rotatable spindle element positioned at least partially within the hopper and downstream of the first opening. The rotatable spindle element includes a shaft having a longitudinal axis and a plurality of teeth coupled to the shaft, the teeth being spaced apart from one another. The apparatus includes a plurality of rods, which extend from the sidewall spaced apart from one another and which are interlaced with the plurality of teeth, and a motor coupled to the rotatable spindle element configured to rotate the rotatable spindle element to cause at least some of the plurality of teeth to rotate and pass between two different rods.

20 Claims, 12 Drawing Sheets

(51) Int. Cl.
  *B02C 13/06* (2006.01)
  *B02C 13/282* (2006.01)
  *B02C 13/28* (2006.01)
  *B02C 13/286* (2006.01)
  *B02C 18/14* (2006.01)
  *B02C 18/22* (2006.01)
  *B02C 18/18* (2006.01)

(52) U.S. Cl.
  CPC ........ *B02C 13/2804* (2013.01); *B02C 13/286* (2013.01); *B02C 18/145* (2013.01); *B02C 18/2291* (2013.01); *B02C 2013/28672* (2013.01); *B02C 2018/188* (2013.01)

(58) Field of Classification Search
  USPC ........................................................ 241/224
  See application file for complete search history.

(56) References Cited

U.S. PATENT DOCUMENTS

| | | | |
|---|---|---|---|
| 3,730,076 A | 5/1973 | Levin | |
| 3,961,090 A | 6/1976 | Weiner et al. | |
| 4,214,518 A | 7/1980 | Petsche | |
| 4,780,327 A | 10/1988 | Gardner-Carimi et al. | |
| 5,040,735 A | 8/1991 | Wensing | |
| 5,048,763 A | 9/1991 | Szazdi, Jr. et al. | |
| 5,076,504 A | 12/1991 | Young | |
| 5,086,924 A | 2/1992 | Oberle | |
| 5,154,363 A | 10/1992 | Eddy | |
| 5,195,685 A | 3/1993 | Dumaine | |
| 5,277,649 A | 1/1994 | Adkison | |
| 5,333,802 A | 8/1994 | Seelig et al. | |
| 5,383,809 A | 1/1995 | Paoli | |
| 5,775,986 A | 7/1998 | Law et al. | |
| 7,377,201 B2 | 5/2008 | Chen | |
| 7,434,755 B2 | 10/2008 | Bridge | |
| 7,607,600 B2 | 10/2009 | Salgado et al. | |
| 7,988,541 B1 | 8/2011 | Zehrer | |
| 8,257,154 B2 | 9/2012 | Seaton | |
| 8,641,263 B2 | 2/2014 | Cabrales et al. | |
| 8,876,511 B2 | 11/2014 | Yamane et al. | |
| 8,967,505 B2 | 3/2015 | Thomas et al. | |
| 9,629,374 B2 | 4/2017 | Hurm et al. | |
| 9,775,360 B2 | 10/2017 | Voyatzakis et al. | |
| 9,776,192 B2 | 10/2017 | Ebadian et al. | |
| 11,224,230 B2 * | 1/2022 | Cameron | B02C 18/2291 |
| 2002/0067797 A1 | 6/2002 | Safai et al. | |
| 2004/0258812 A1 | 12/2004 | Crider et al. | |
| 2005/0242221 A1 | 11/2005 | Rota | |
| 2008/0317935 A1 | 12/2008 | Stanley et al. | |
| 2011/0114773 A1 | 5/2011 | Carpenter | |
| 2011/0293817 A1 | 12/2011 | Hurm et al. | |
| 2014/0242232 A1 | 8/2014 | McDonald | |
| 2014/0302207 A1 | 10/2014 | Meduri et al. | |
| 2015/0342239 A1 | 12/2015 | Dierenfeld | |
| 2016/0107196 A1 | 4/2016 | Rosado | |
| 2017/0079290 A1 | 3/2017 | Voyatzakis et al. | |
| 2018/0161780 A1 | 6/2018 | Mesa-Arias | |
| 2018/0242620 A1 | 8/2018 | Song | |
| 2019/0150459 A1 | 5/2019 | De Los Santos Gualque | |
| 2019/0200806 A1 | 7/2019 | Borovicka et al. | |

FOREIGN PATENT DOCUMENTS

| | | |
|---|---|---|
| CN | 104397746 A | 3/2015 |
| CN | 104856089 A | 8/2015 |
| CN | 105192725 A | 12/2015 |
| WO | 9631279 A1 | 10/1996 |
| WO | 2004110633 A1 | 12/2004 |

OTHER PUBLICATIONS

Author Unknown, "howto shred a rotisserie chicken: easy bbq shredded chicken sliders," unsophisticook.com/how-to-shred-a-rotisserie-chicken/, May 18, 2016, Shay Bocks, 20 pages.
Non-Final Office Action for U.S. Appl. No. 16/534,023, dated Mar. 1, 2022, 9 pages.
Non-Final Office Action for U.S. Appl. No. 16/534,220, dated May 17, 2021, 7 pages.
Final Office Action for U.S. Appl. No. 16/534,023, dated Jun. 20, 2022, 12 pages.

* cited by examiner

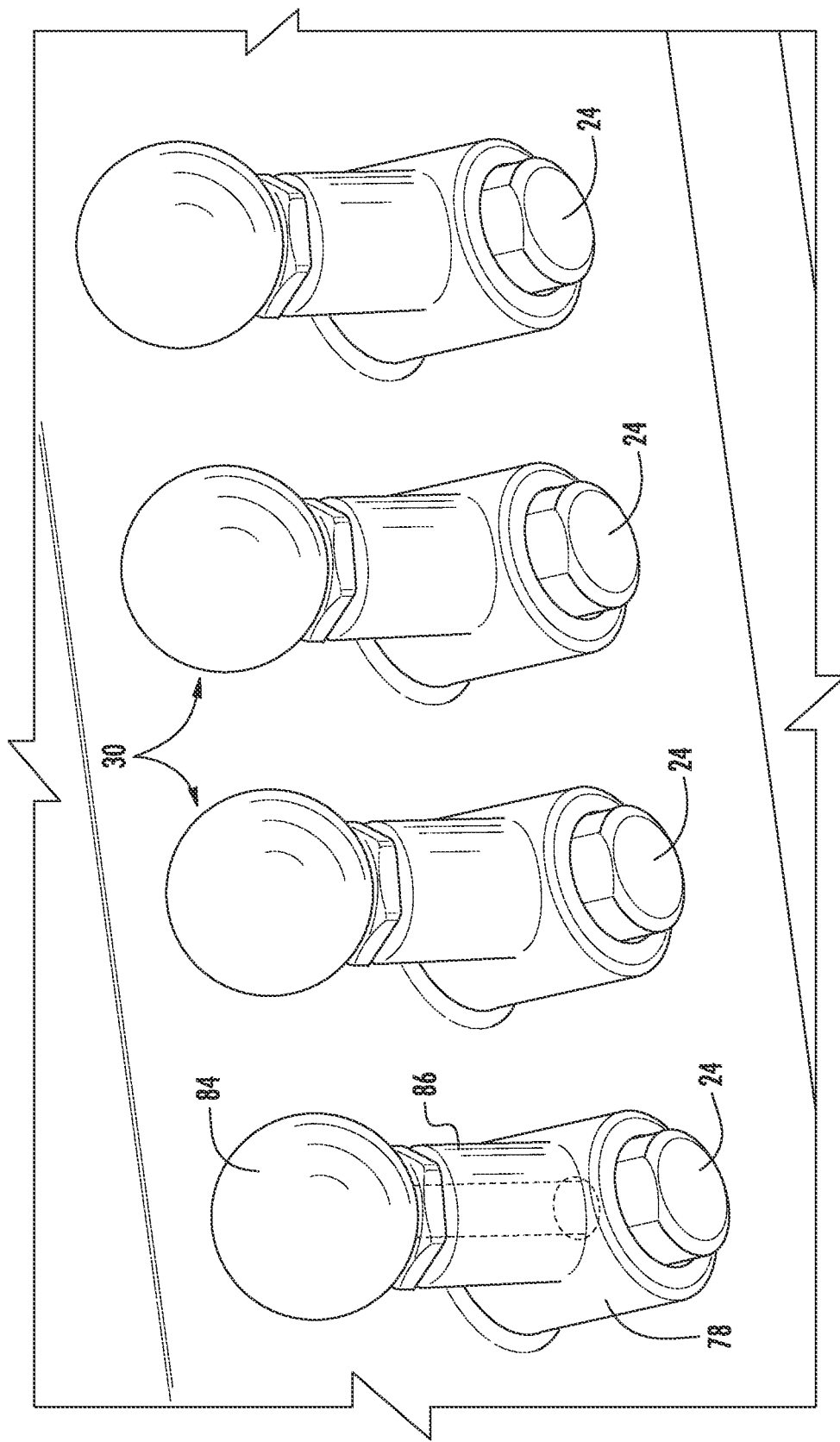

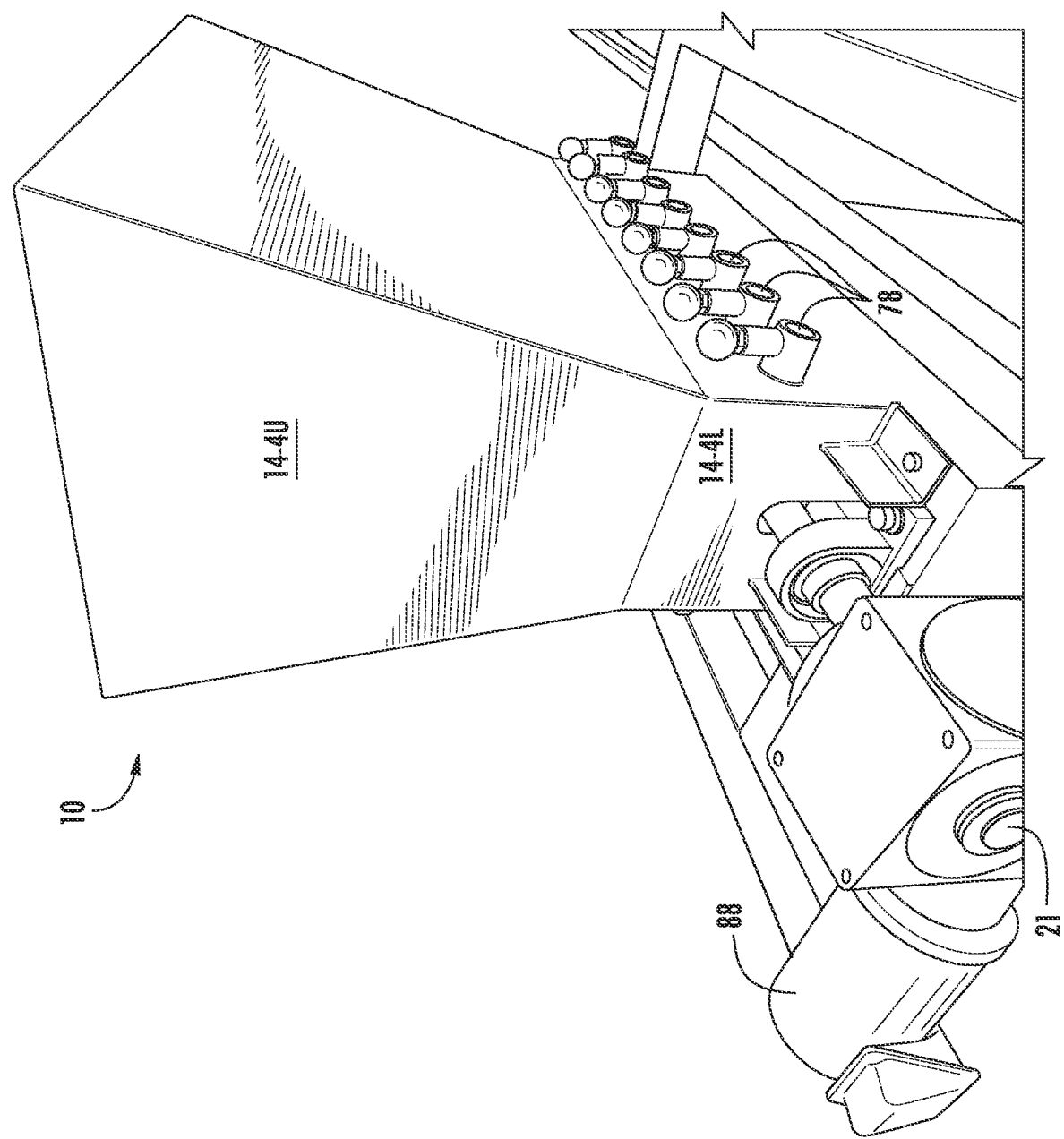

APPARATUS FOR TEARING MEAT

RELATED APPLICATIONS

This application is a continuation of U.S. patent application Ser. No. 16/534,220, filed on Aug. 7, 2019 and subsequently issued as U.S. Pat. No. 11,224,230, wherein the entire contents of the foregoing application and patent are hereby incorporated by reference herein. This application is also related to U.S. patent application Ser. No. 16/534,023, filed on Aug. 7, 2019 and subsequently abandoned, wherein the entire contents of the foregoing application are hereby incorporated by reference herein.

BACKGROUND

Pulled meat products are highly popular with consumers. In a meat production facility where the raw ingredients are relatively large pieces of meat, such as 38 ounces or larger, the amount of tearing/pulling necessary to obtain a desired piece size can be highly labor-intensive, resulting in relatively high costs to purchasers, such as restaurants and grocery stores.

SUMMARY

The embodiments herein relate to a meat-tearing or meat-pulling machine which is configured to receive relatively large pieces of cooked meat, such as 24 ounces, 36 ounces, 48 ounces or larger, and automatically tear the meat pieces into smaller meat pieces which may be suitable in size for the intended purpose, or may be manually torn into smaller meat pieces. Among other advantages, the embodiments greatly reduce the amount of manual labor necessary to tear large quantities of relatively large pieces of meat into a suitable piece size. In some embodiments, the meat-tearing machine is adjustable to allow for a plurality of different piece sizes to be produced.

In one embodiment an apparatus is provided. The apparatus includes a gravity-fed hopper that includes at least one sidewall that forms a first opening configured to receive meat articles and a second opening configured to discharge torn meat articles. The apparatus further includes a rotatable spindle element positioned at least partially within the hopper and downstream of the first opening. The rotatable spindle element includes a shaft having a longitudinal axis, and a plurality of teeth coupled to the shaft, the teeth spaced apart from one another along a length of the shaft. The apparatus also includes a plurality of rods that extend from the sidewall spaced apart from one another, the plurality of rods being interlaced with the plurality of teeth. A motor is coupled to the rotatable spindle element and is configured to rotate the rotatable spindle element to cause at least some of the plurality of teeth to rotate and pass between two different rods of the plurality of rods.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 8 illustrates a plurality of rods locked via corresponding rod adjustment mechanisms to expose a desired length of the rods to an interior of the hopper according to one embodiment;

FIG. 9 illustrates another view of the meat-tearing apparatus according to one embodiment.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Pulled meat products are highly popular with consumers. In a meat production facility where the raw ingredients are relatively large pieces of meat, such as 38 ounces or larger, the amount of tearing/pulling necessary to obtain a desired piece size can be highly labor-intensive, resulting in relatively high costs to purchasers, such as restaurants and grocery stores.

The embodiments herein relate to a meat-tearing or meat-pulling machine that is configured to receive relatively large pieces of cooked meat, such as 24 ounces, 36 ounces, 48 ounces or larger, and automatically tear the meat pieces into smaller meat pieces which may be suitable in size for the intended purpose, or may be manually torn into even smaller meat pieces. The embodiments greatly reduce the amount of manual labor necessary to tear large quantities of relatively large pieces of meat into a suitable piece size. In some embodiments, the meat-tearing machine is adjustable to allow for a plurality of different piece sizes to be produced.

Figure 1:
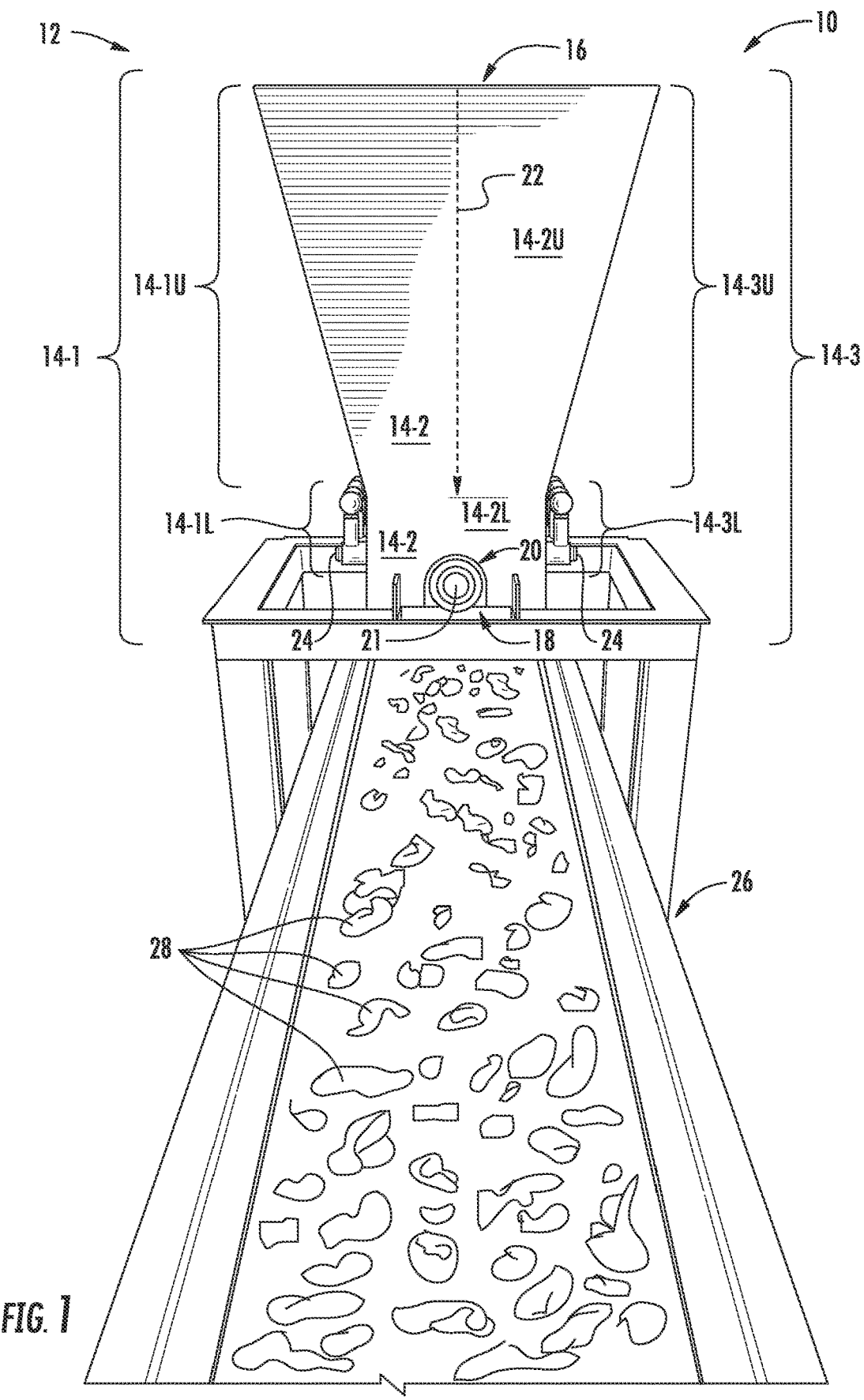
FIG. 1 is a first side view of a meat-tearing apparatus according to one embodiment.

FIG. 1 is a first side view of a meat-tearing apparatus 10 according to one embodiment. The meat-tearing apparatus 10 includes a hopper 12 that includes at least one sidewall 14. In this embodiment, the hopper 12 has four sidewalls 14-1-14-4 (14-4 illustrated in FIG. 2), but in other embodiments, the hopper 12 may comprise a single circular or oval sidewall 14. The hopper 12 forms a first opening 16 configured to receive cooked meat articles (e.g., pieces of meat), and a second opening 18 configured to discharge torn meat articles. A rotatable spindle element 20 is positioned at least partially within the hopper 12 and in a downstream direction 22 with respect to the first opening 16. As will be discussed in greater detail below, the rotatable spindle element 20 includes a shaft 21 and a plurality of teeth coupled to the shaft.

In this example, the sidewall 14-1 includes an upper sidewall portion 14-1U and a lower sidewall portion 14-1L, the sidewall 14-2 includes an upper sidewall portion 14-2U and a lower sidewall portion 14-2L, and the sidewall 14-3 includes an upper sidewall portion 14-3U and a lower sidewall portion 14-3L. The upper sidewall portions 14-1U and 14-3U oppose one another and are sloped, are non-parallel with respect to one another, and taper in the downstream direction 22. In this embodiment, the lower sidewall portions 14-1L and 14-3L oppose one another, are non-sloped and are parallel with respect to one another; however, in other embodiments, the lower sidewall portions 14-1L and 14-3L may also be sloped to taper in the downstream direction 22.

The meat-tearing apparatus 10 includes a plurality of rods 24 that extend from sidewalls 14-1L and 14-3L. A motor (not illustrated in FIG. 1) is coupled to the rotatable spindle element 20 and is configured to rotate the rotatable spindle element 20 to cause at least some of the plurality of teeth to rotate and pass between two different rods 24 of the plurality of rods 24, thereby tearing a meat article caught between the teeth and the rods into smaller pieces.

In this embodiment the meat-tearing apparatus 10 is positioned above a conveyer belt 26 upon which torn meat articles 28 discharged from the second opening 18 land. If the sizes of the torn meat articles 28 are not sufficiently small, the torn meat articles 28 can be hand-torn into smaller pieces to achieve a desired size. While the meat-tearing apparatus 10 can be utilized with any type of meat, solely for purposes of illustration, the meat-tearing apparatus 10 is illustrated herein as being utilized in the processing of cooked chicken pieces.

Figure 2:
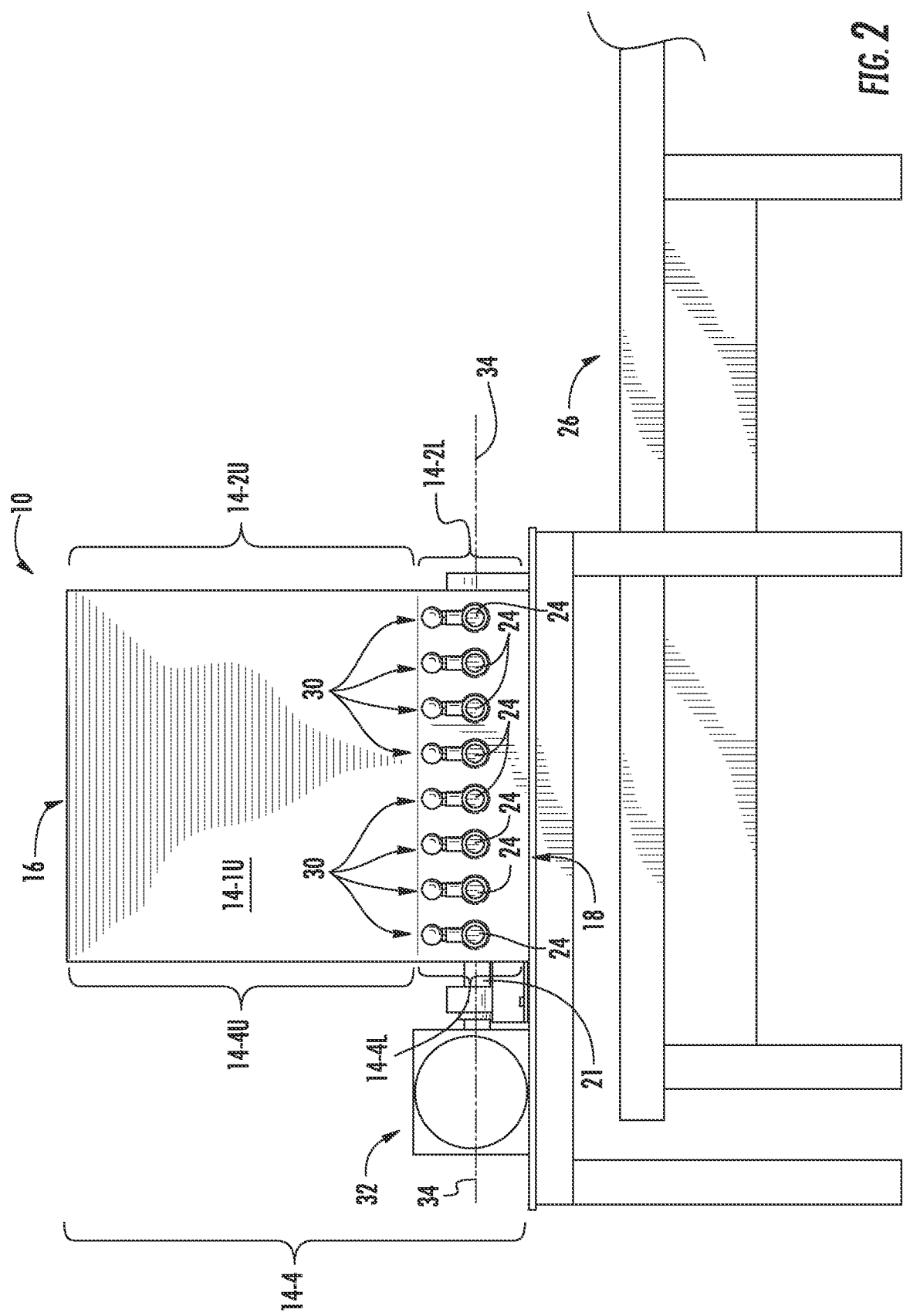
FIG. 2 is a second side view of the meat-tearing apparatus according to one embodiment.

FIG. 2 is a second side view of the meat-tearing apparatus 10. The sidewall 14-4 includes an upper sidewall portion 14-4U and a lower sidewall portion 1-4L. The upper sidewall portion 14-4U and the upper sidewall portion 14-2U are non-sloped and parallel with respect to one another. The lower sidewall portion 14-4L and the lower sidewall portion 14-2L are also parallel with respect to one another. In this example, the meat-tearing apparatus 10 includes 16 rods 24 (eight rods 24 illustrated in FIG. 2) that extend from two opposing lower sidewall portions 14-1L, 14-3L of the hopper 12 into an interior of the hopper 12. As will be discussed in greater detail below, the hopper 12 may include rod adjustment elements 30 that facilitate adjustment of the length of the rods 24 that are exposed to the interior of the hopper 12 to alter an average size of the torn meat articles 28.

The meat-tearing apparatus 10 includes a drive mechanism 32 that may include, for example, a motor, and in some embodiments a translation mechanism, to cause the rotatable spindle element 20 to rotate about a longitudinal axis 34 of the shaft 21.

Figure 3:
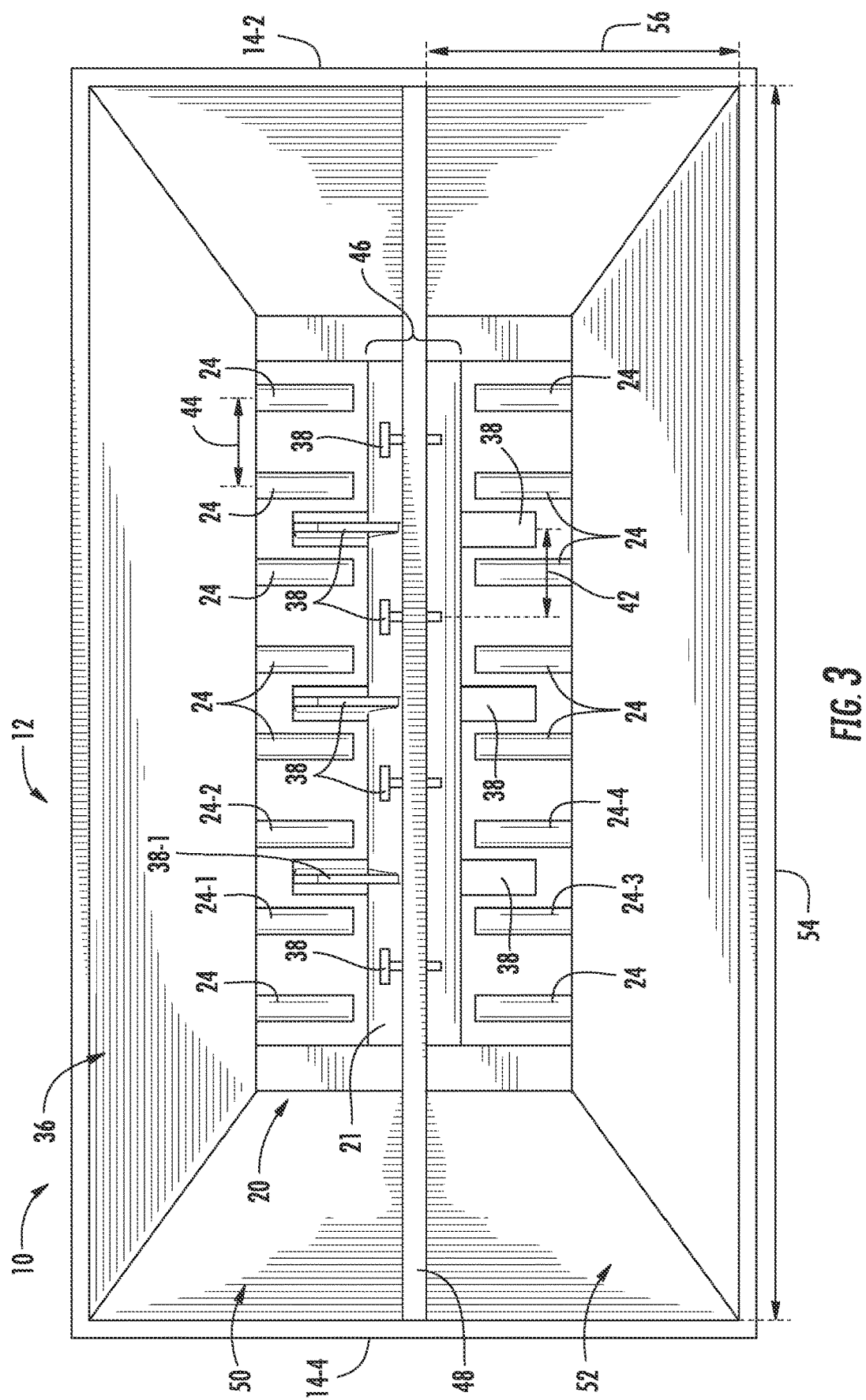
FIG. 3 illustrates a view of an interior of a hopper of the meat-tearing apparatus.

FIG. 3 illustrates a view of an interior 36 of the hopper 12 of the meat-tearing apparatus 10. A plurality of spaced apart teeth 38, in this example fourteen teeth 38, are coupled to the shaft 21 of the rotatable spindle element 20 along a length of the shaft 21. The shaft 21 extends from the lower sidewall portion 14-2L to the lower sidewall portion 14-4L. The rods 24, which are also spaced apart from one another, extend from lower sidewall portions 14-1L, 14-3L into an interior 36 of the hopper 12. The rods 24 and teeth 38 are spaced such that the rods 24 and the teeth 38 are interlaced with one another. As the rotatable spindle element 20 rotates, each tooth 38 passes between two different rods 24 when the respective tooth 38 is rotating in a downward direction, and also passes between two different rods 24 when rotating in an upward direction. For example, a tooth 38-1 passes between two rods 24-1, 24-2 when rotating in the downward direction, and passes between two rods 24-3, 24-4 when rotating in the upward direction.

Each rod 24, 24-1-24-4 is slidably adjustable to alter a distance between an end of the respective rod 24, 24-1-24-4 and the shaft 21. The distance between the end of the rods 24, 24-1-24-4 and the shaft 21 affects a size of the torn meat articles produced by the meat-tearing apparatus 10. In particular, the larger the distance between the end of the rods 24, 24-1-24-4 and the shaft 21, the larger the size of the torn meat articles produced by the meat-tearing apparatus 10. In some embodiments, the teeth 38 are spaced a distance apart from one another, such as, by way of non-limiting example, a distance in a range between about 2 inches and about 4 inches. In some embodiments, the distance is about 3 inches, on center, as illustrated by a distance 42. Similarly, in some embodiments, the rods 24, 24-1-24-4 are spaced a distance apart from one another, such as, by way of non-limiting example, a distance in a range between about 2 inches and about 4 inches. In some embodiments, the distance is about 3 inches, on center, as illustrated by a distance 44. In some embodiments the shaft 21 has a diameter 46 between about 2 inches and about 4 inches. In some embodiments the shaft 21 has a diameter 46 of about 3 inches.

In this embodiment, the hopper 12 includes an interior wall 48 that divides the interior 36 of the hopper into two chambers 50, 52. The interior wall 48 has a bottom edge that is spaced a sufficient distance from the rotatable spindle element 20 to allow the plurality of teeth 38 to rotate about the longitudinal axis 34 of the shaft 21 and avoid contact with the bottom edge of the interior wall 48. In some embodiments, the bottom edge of the interior wall 48 is parallel to the longitudinal axis 34 and is spaced a distance from the longitudinal axis 34 such that when each tooth 38, during rotation of the rotatable spindle element 20, is at a closest distance to the bottom edge, the tooth 38 is in a range of about 0.5 inches to about 3 inches from the bottom edge. In this embodiment, the two chambers 50, 52 have equal volumes. In this embodiment, each chamber 50, 52 has a length 54 of about 25 inches, and a width 56 of about 10 inches.

Figure 4:
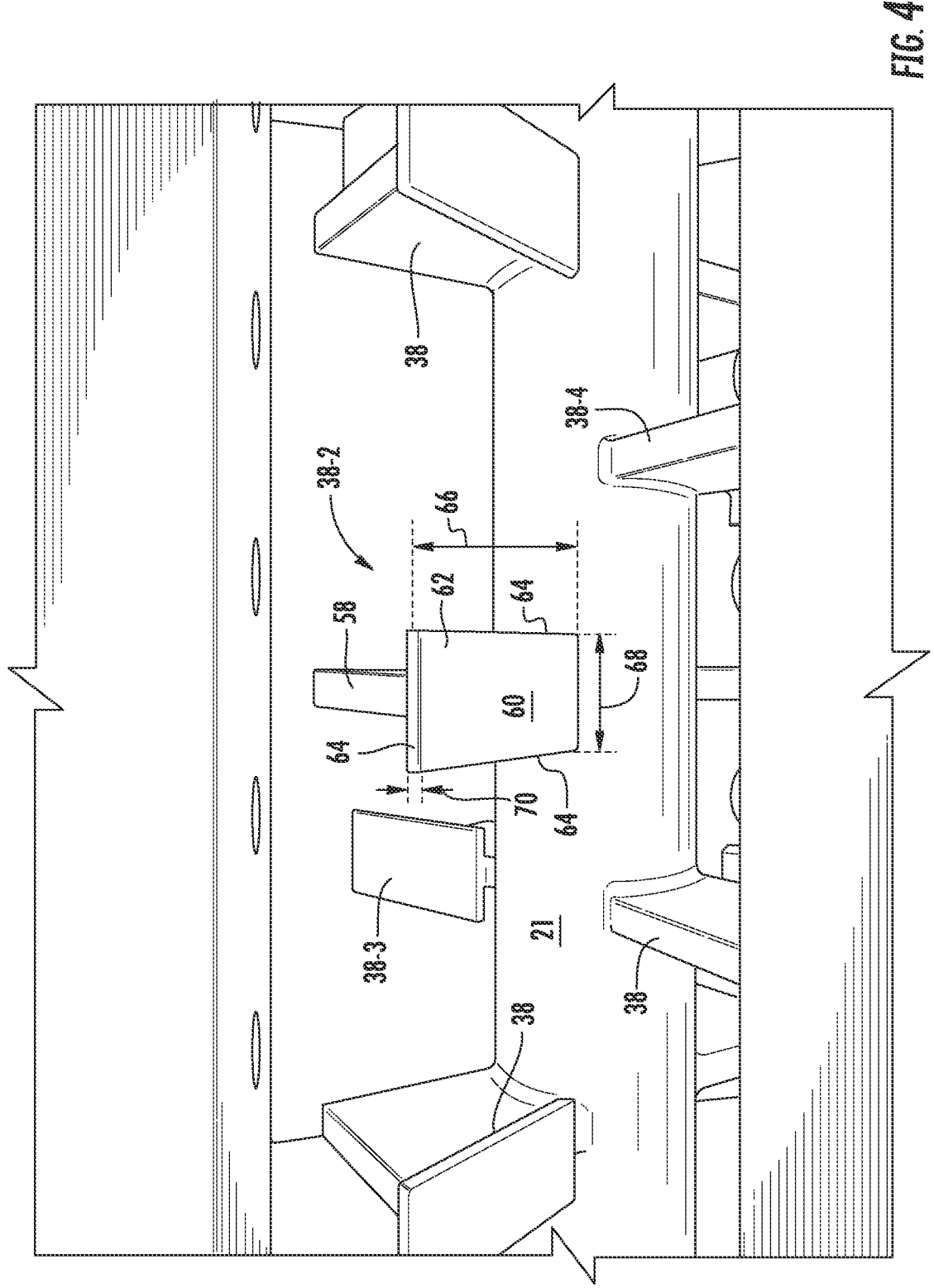
FIG. 4 illustrates an enlarged view of several teeth coupled to a shaft of the meat-tearing apparatus according to one embodiment.

FIG. 4 illustrates an enlarged view of several teeth 38, 38-2-38-4 coupled to the shaft 21 of the meat-tearing apparatus 10 according to one embodiment. The tooth 38-2 includes a support member 58 coupled to the shaft 21, and a meat-tearing element 60 coupled to the support member 58. In this example, the meat-tearing element 60 comprises a plate having a face 62 and edges 64, the edges 64 being planar and being 90 degrees or greater with respect to the face 62. In this embodiment, the meat-tearing element 60 has a length 66 of about 3 inches, a width 68 of about 1.5 inches, and a thickness 70 of about ⅛ inches. The teeth 38 may comprise any rigid material suitable for processing a cooked meat article, such as stainless steel or the like. In this embodiment, the teeth 38 are arranged in four rows along the shaft 21, each tooth 38 being positioned 90 degrees from an adjacent tooth along the shaft 21. For example, a tooth 38-3, in a first row of teeth 38, is positioned 90 degrees from the adjacent tooth 38-2 in a second row of teeth 38, which is positioned 90 degrees from an adjacent tooth 38-4 in a third row of teeth 38.

Figure 5:
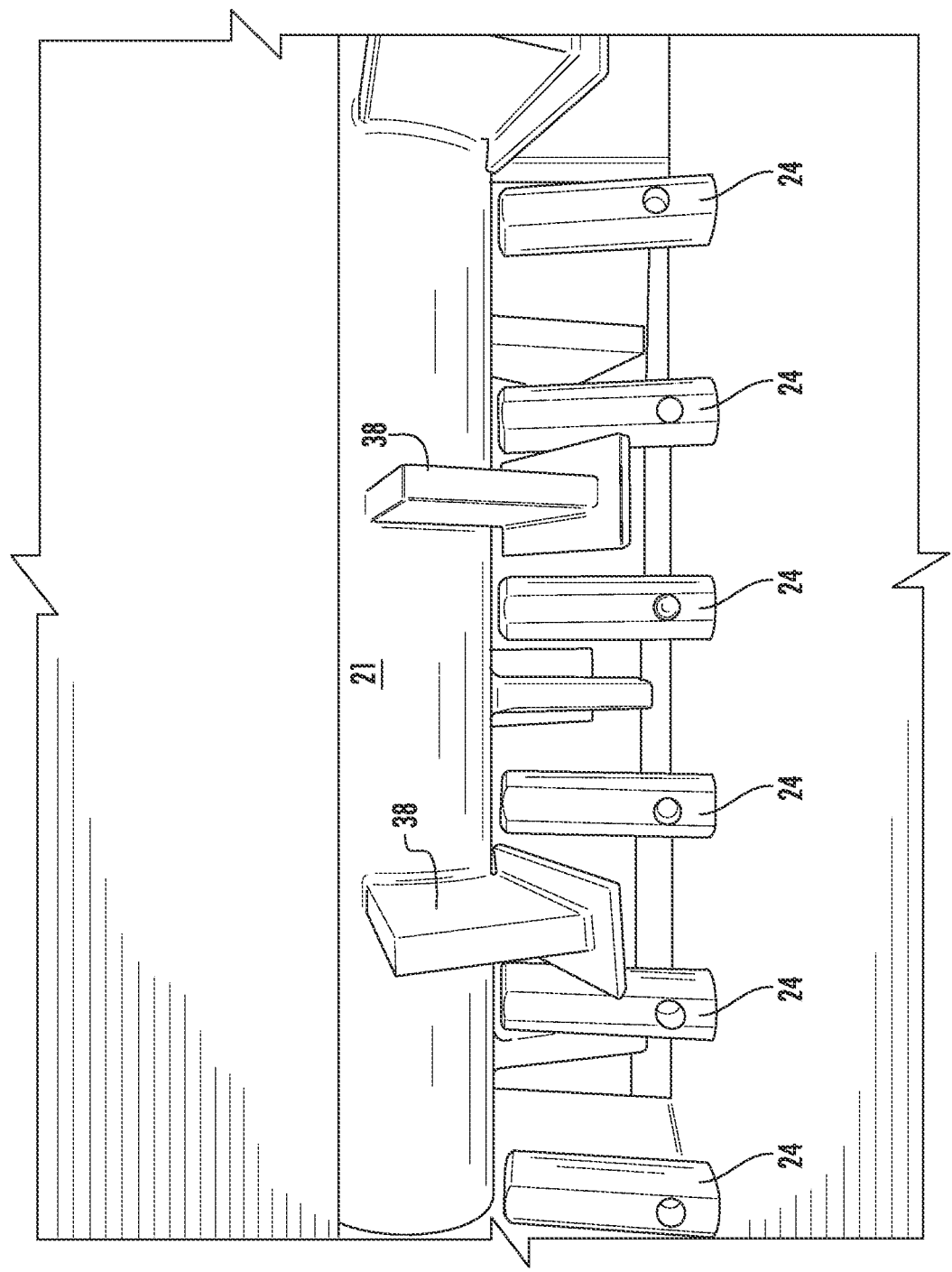
FIG. 5 illustrates an enlarged view of several teeth and several rods according to one embodiment.

FIG. 5 illustrates an enlarged view of several teeth 38 and several rods 24, according to one embodiment. As the shaft 21 rotates, each tooth 38 passes between two rods 24, tearing any meat articles that are caught between the teeth 38 and the rods 24.

Figure 6:
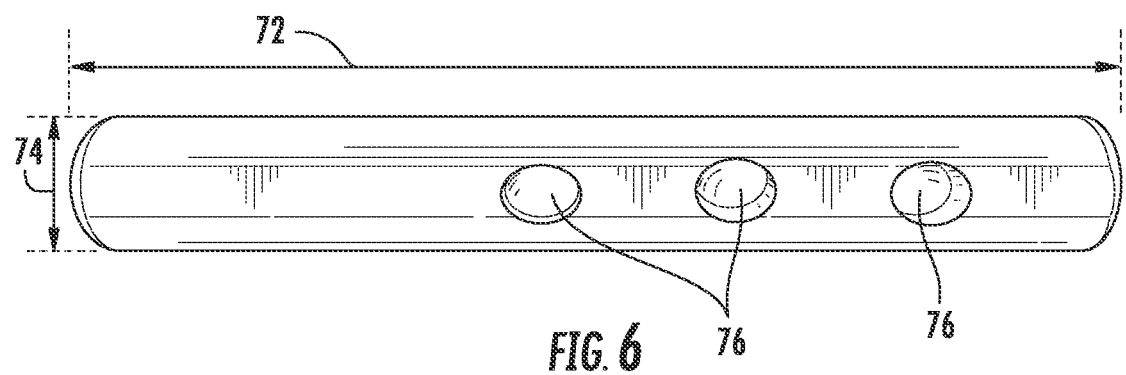
FIG. 6 illustrates a rod according to one embodiment.

FIG. 6 illustrates a rod 24 according to one embodiment. In this embodiment, the rod 24 has a length 72 of about 5.5 inches in length and a diameter 74 of about 1 inch. The rod 24 has three openings 76. In this example, the openings 76 are blind holes and do not extend all the way through the rod 24, but in other embodiments, the openings 76 comprise through holes. The openings 76, as described in greater detail below, allow adjustment of the length of the rod 24 that is exposed to the interior 36 of the hopper 12. While only three openings 76 are illustrated, the rods 24 may comprise any number of openings 76.

Figure 7:
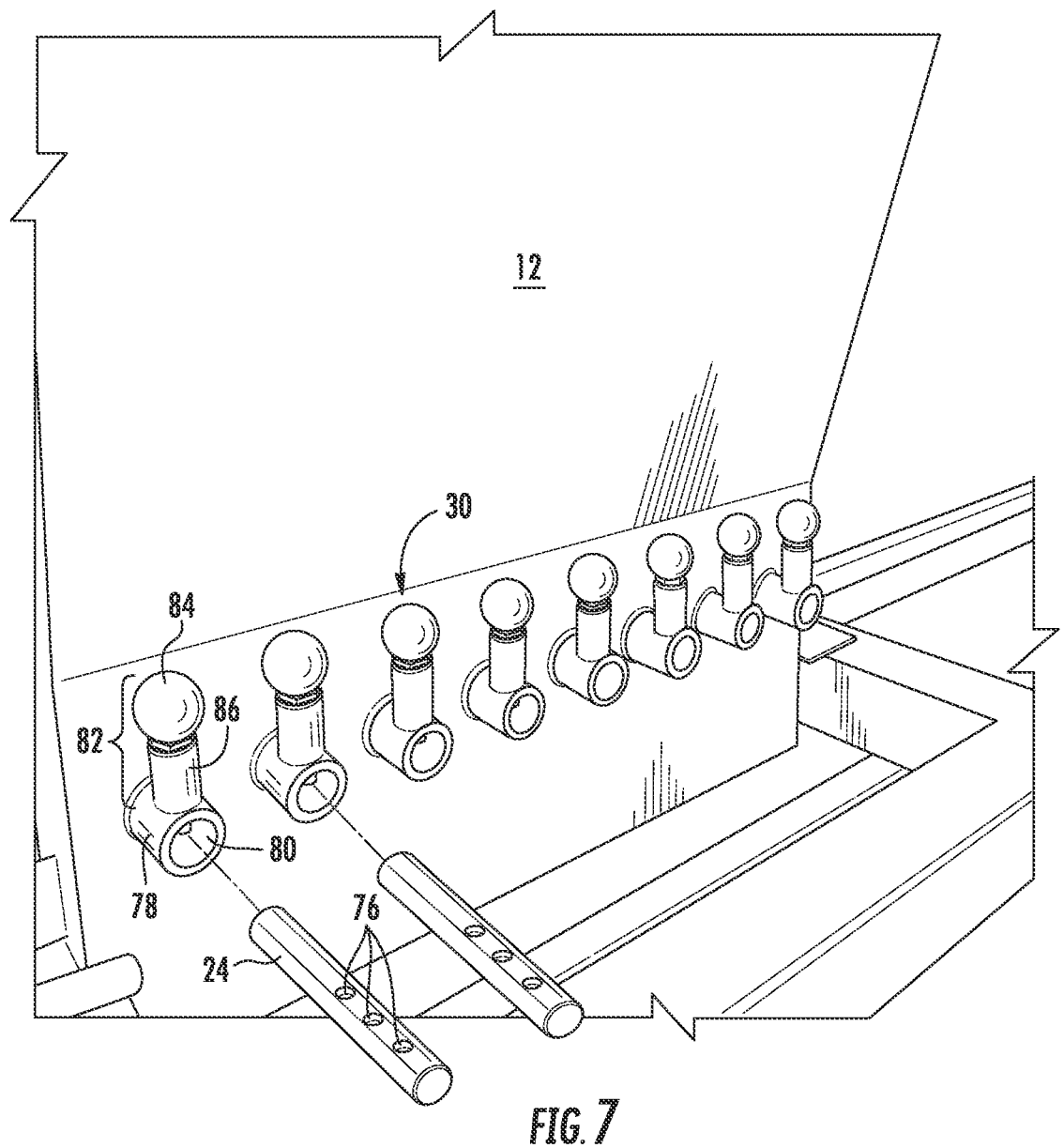
FIG. 7 illustrates rod adjustment elements according to one embodiment.

FIG. 7 illustrates the rod adjustment elements 30 according to one embodiment. The rod adjustment elements 30 include a sleeve 78 fixed to an exterior of the hopper 12. The sleeve 78 forms a hollow cylinder that is in communication with an interior of the hopper 12. The sleeve 78 includes a rod-receiving opening 80 configured to receive a rod 24 to facilitate entry of at least a portion of the rod 24 into the interior 36 of the hopper 12. The sleeve 78 includes a rod-locking mechanism 82 configured to lock the rod 24 with respect to the sleeve 78 to inhibit movement of the rod 24. In this embodiment, the rod-locking mechanism 82 comprises a pin 84 that can be inserted into a pin guide 86 to engage an opening 76 in the rod 24 that is positioned in the sleeve 78 to thereby inhibit movement of the rod 24.

FIG. 8 illustrates a plurality of rods 24 locked via corresponding rod adjustment elements 30 to expose a desired length of the rods 24 to the interior 36 of the hopper 12 according to one embodiment.

FIG. 9 illustrates another view of the meat-tearing apparatus 10 according to one embodiment. The meat-tearing apparatus 10 includes a motor 88 that is configured to rotate the shaft 21. In this view, the rods 24 have been removed from the sleeves 78.

Figure 10A:
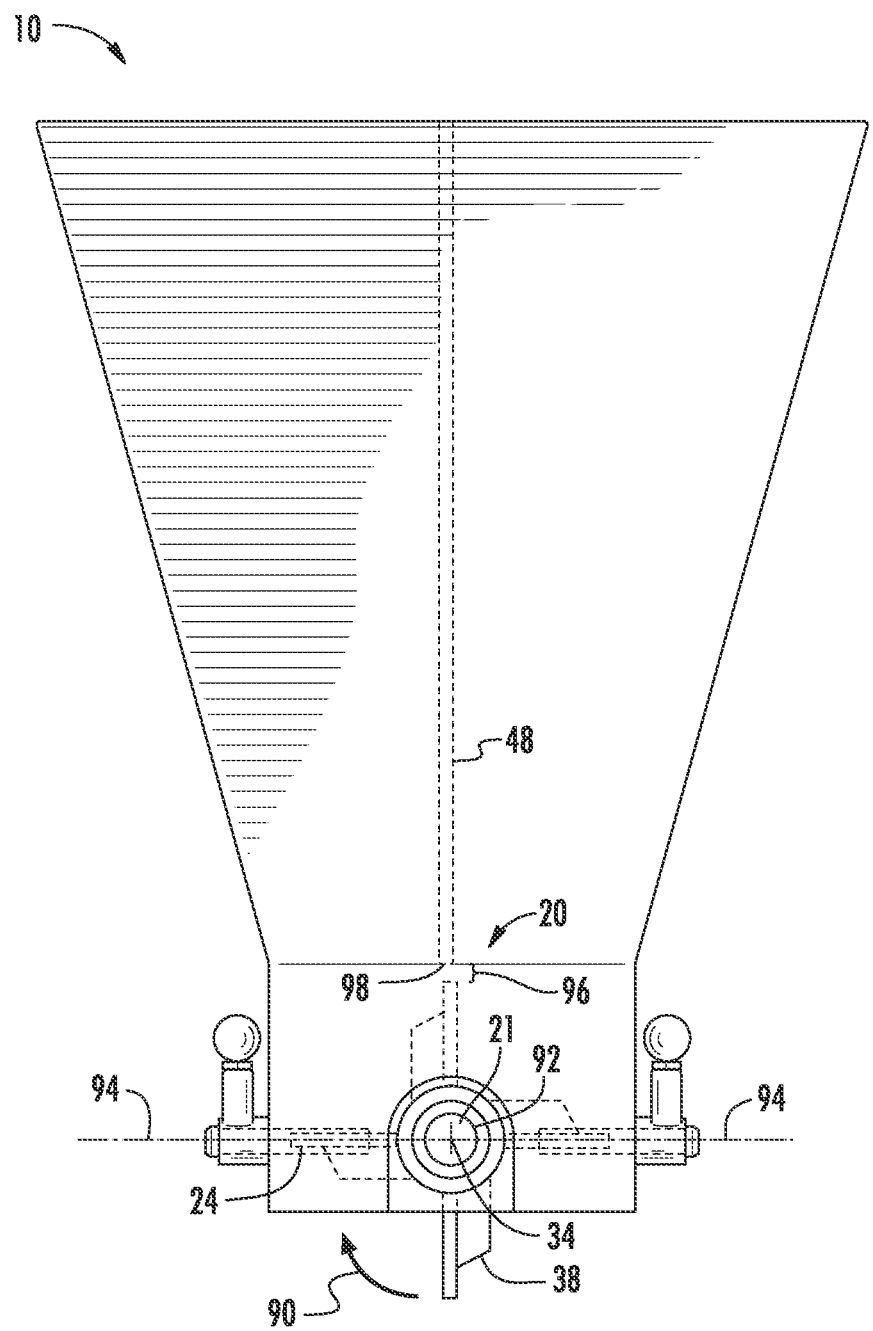
FIGS. 10A-10D illustrate the meat-tearing apparatus at four different instances in time during operation according to one embodiment.

FIGS. 10A-10D illustrate the meat-tearing apparatus 10 at four different instances in time during operation according to one embodiment. Referring first to FIG. 10A, the rotatable spindle element 20 rotates the teeth 38 in a direction 90. In this embodiment the shaft 21 has a perimeter 92, and each rod 24 has a respective longitudinal axis 94, and lines that are collinear with the respective longitudinal axes 94 intersect the perimeter 92 of the shaft 21. In this embodiment, the interior wall 48 is in a plane that intersects the longitudinal axis 34 of the shaft 21. In this embodiment, a closest distance 96 between a tooth 38 and a bottom edge 98 of the interior wall 48 is in a range of about 0.5 inches to about 3 inches.

Figure 10B:
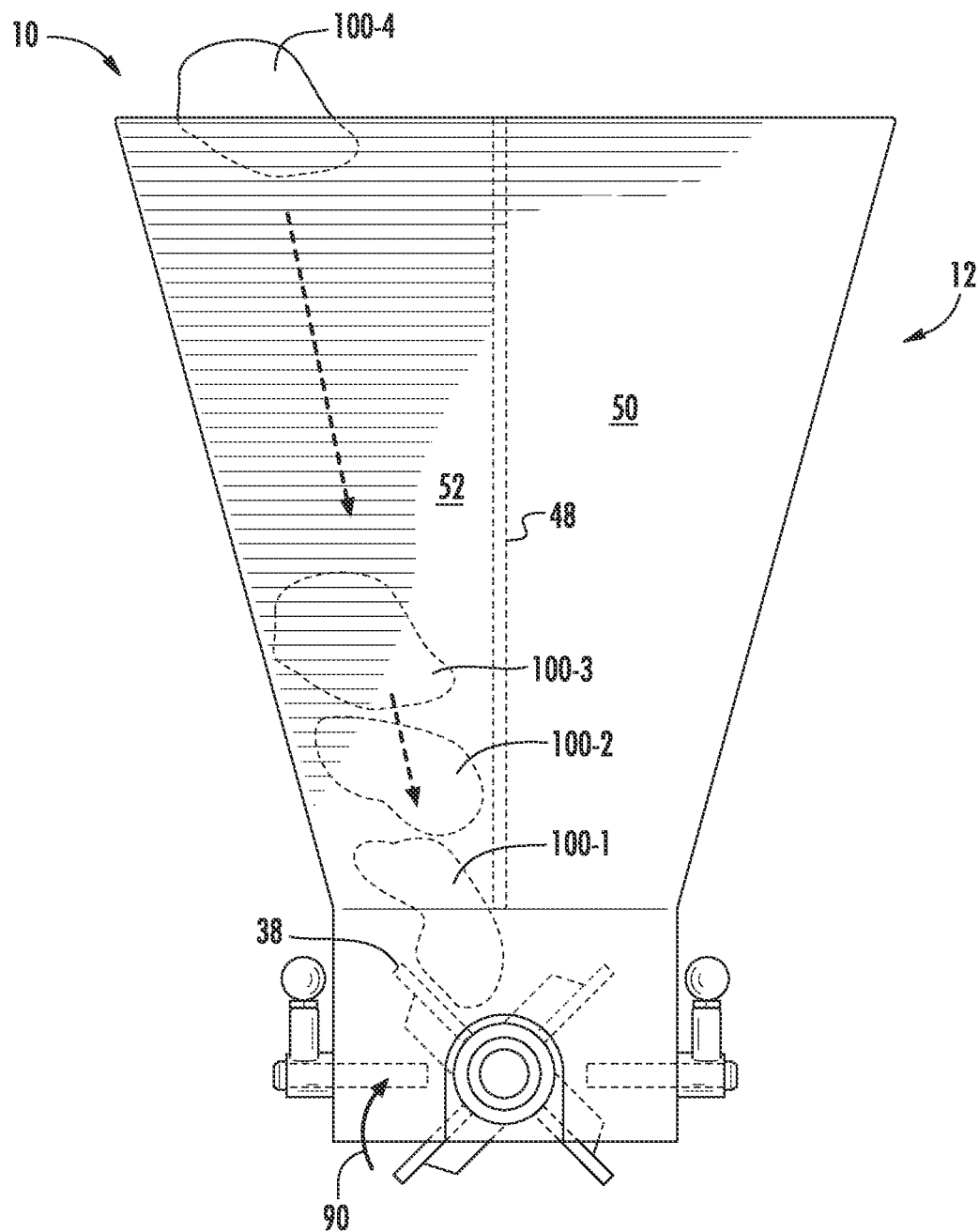
Figure 10C:
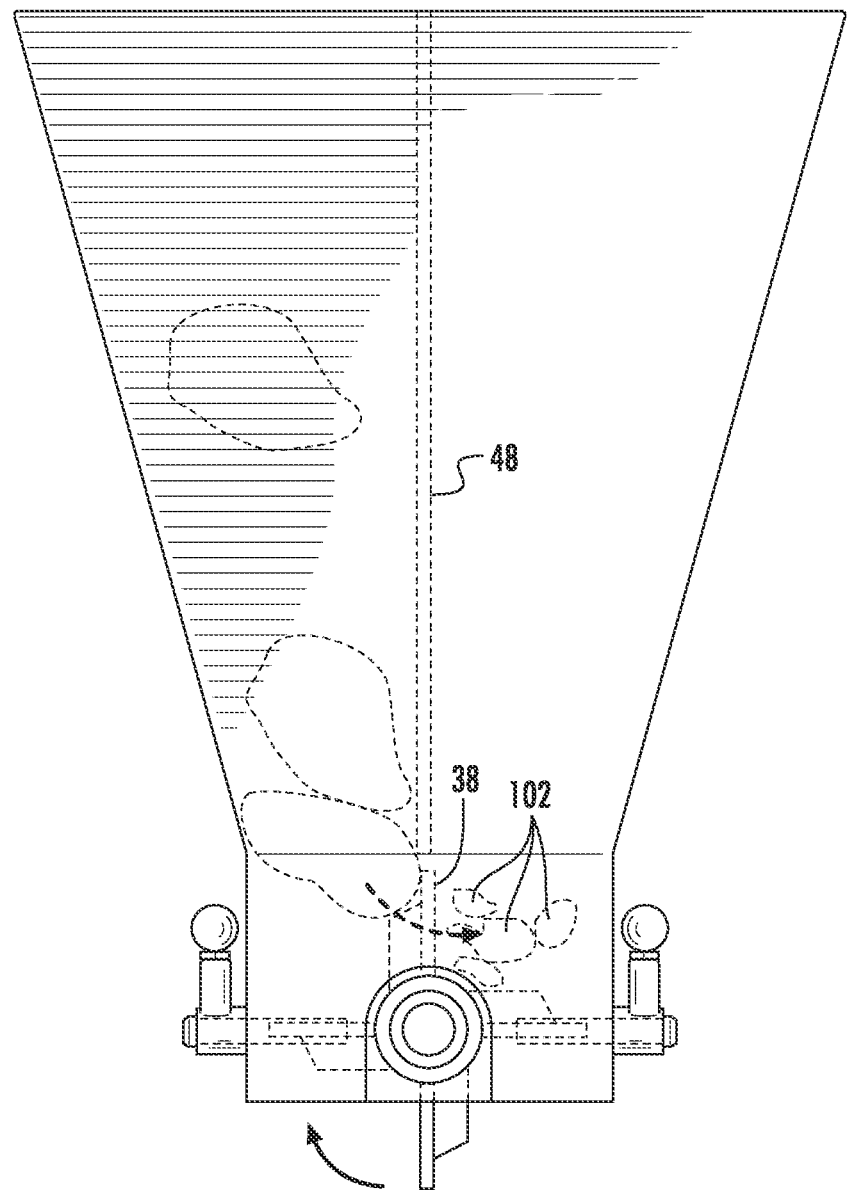
Figure 10D:
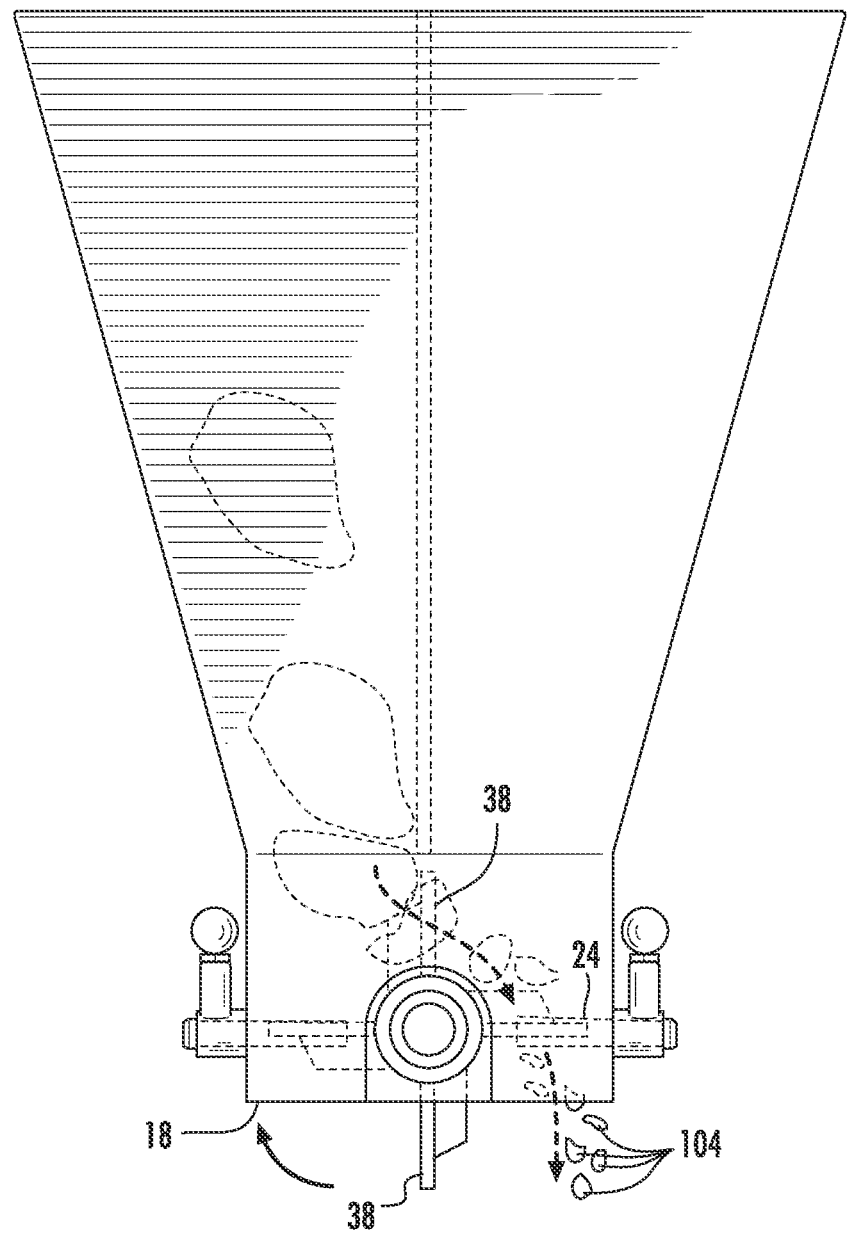

Referring now to FIG. 10B as the rotatable spindle element 20 rotates, a plurality of meat articles 100-1-100-4 are introduced into the chamber 52. Note that meat articles may also be introduced into the chamber 50, and thus meat articles can be concurrently introduced into the hopper 12 from both sides of the hopper 12. The meat article 100-1 lands between at least one tooth 38 and the interior wall 48. Referring now to FIG. 10C, one or more teeth 38 urge the meat article 100-1 in a direction toward and past the interior wall 48, where some of the meat article 100-1 impacts the interior wall 48, and the meat article 100-1 is thereby torn by the teeth 38 and the interior wall 48 into a plurality of torn meat articles 102. Referring now to FIG. 10D, the teeth 38 urge the plurality of torn meat articles 102 against one or more rods 24, further tearing the plurality of torn meat articles 102 into a plurality of smaller meat articles 104. The smaller meat articles 104 exit the second opening 18 and, in some embodiments, drop to a conveyer belt. If the smaller meat articles 104 are not the desired size, individuals on both sides of the conveyer belt can manually further tear the smaller meat articles 104 into torn meat pieces of the desired size.

Those skilled in the art will recognize improvements and modifications to the preferred embodiments of the disclosure. All such improvements and modifications are considered within the scope of the concepts disclosed herein and the claims that follow.

What is claimed is:

1. An apparatus comprising:
 a gravity-fed hopper comprising at least one sidewall that forms a first opening configured to receive meat articles and a second opening configured to discharge torn meat articles;
 a rotatable spindle element positioned at least partially within the hopper and downstream of the first opening, the rotatable spindle element comprising:
 a shaft having a longitudinal axis; and
 a plurality of teeth coupled to the shaft, wherein teeth of the plurality of teeth are spaced apart from one another along a length of the shaft, and wherein at least one tooth of the plurality of teeth comprises a support member coupled to the shaft, and comprises a meat-tearing element coupled to the support member;
 a plurality of rods that extend from the sidewall spaced apart from one another, the plurality of rods being interlaced with the plurality of teeth; and
 a motor coupled to the rotatable spindle element configured to rotate the rotatable spindle element to cause at least some of the plurality of teeth to rotate and pass between two different rods of the plurality of rods.

2. The apparatus of claim 1 further comprising an interior wall that divides an interior of the hopper into two chambers, the interior wall having a bottom edge that is spaced a sufficient distance from the rotatable spindle element to allow the plurality of teeth to rotate and avoid contact with the bottom edge.

3. The apparatus of claim 2 wherein the bottom edge is parallel to the longitudinal axis and spaced a distance from the longitudinal axis to allow the plurality of teeth, when at a closest distance to the bottom edge, to be separated from the bottom edge by a distance in a range of 0.5 inches to 3 inches.

4. The apparatus of claim 2 wherein the interior wall is in a plane that intersects the longitudinal axis of the shaft.

5. The apparatus of claim 2 wherein the two chambers have equal volumes.

6. The apparatus of claim 1 wherein the at least one sidewall comprises:
   a sloped portion comprising four upper sidewalls, two opposing upper sidewalls being non-parallel to one another and two other opposing upper sidewalls being parallel to one another; and
   a non-sloped portion, the non-sloped portion comprising four lower sidewalls, each pair of opposing sidewalls being parallel to one another.

7. The apparatus of claim 6 wherein the shaft extends from a first lower sidewall to a second lower sidewall, and wherein the plurality of rods extends into an interior of the hopper from a third lower sidewall and a fourth lower sidewall.

8. The apparatus of claim 1 wherein each rod is slidably adjustable to alter a distance between an end of the rod and the shaft.

9. The apparatus of claim 1 further comprising:
   a plurality of sleeves fixed to an exterior of the hopper, each sleeve forming a hollow cylinder that is in communication with an interior of the hopper, each sleeve having a rod-receiving opening configured to receive one of the plurality of rods and to facilitate entry of at least a portion of the respective rod into the interior of the hopper, and each sleeve having a rod-locking mechanism configured to lock a particular rod with respect to the sleeve to inhibit movement of the particular rod.

10. The apparatus of claim 9 wherein each rod has a plurality of holes along a length of the rod, and wherein the rod-locking mechanism comprises a pin opening formed in the sleeve, the pin opening being configured to receive a pin that engages a hole in a rod that is positioned in the sleeve to thereby inhibit movement of the rod.

11. The apparatus of claim 1 wherein the meat-tearing element comprises a plate having a face and edges, the edges being planar and being oriented 90 degrees or greater from the face.

12. The apparatus of claim 11 wherein the meat-tearing element comprises a plate having a length of about 3 inches, a width of about 1.5 inches, and a thickness of about 0.125 inches.

13. The apparatus of claim 1 wherein each tooth of the plurality of teeth is spaced about 3 inches apart, on center, from the next tooth along the length of the shaft.

14. The apparatus of claim 13 wherein each rod of the plurality of rods is spaced about 3 inches apart, on center, from the next adjacent rod.

15. The apparatus of claim 1 wherein the shaft has a perimeter, and each rod has a respective longitudinal axis, and wherein lines that are collinear with the respective longitudinal axes intersect the perimeter of the shaft.

16. The apparatus of claim 1 wherein teeth of the plurality of teeth are arranged in four rows along the shaft, each tooth of the plurality of teeth being positioned 90 degrees from an adjacent tooth.

17. The apparatus of claim 1 wherein at least one rod of the plurality of rods is about 5.5 inches in length and about 1 inch in diameter.

18. The apparatus of claim 1 wherein the plurality of rods comprises 16 rods, wherein a first 8 rods extend in an interior of the hopper in a first direction toward the shaft from a first side of the hopper, and a second 8 rods extend in the interior of the hopper in a second direction toward the shaft from a second side of the hopper.

19. The apparatus of claim 1 wherein the first opening is about 25 inches in length and about 20 inches in width, and wherein an interior wall forms two chambers, each chamber being about 25 inches in length and about 10 inches in width.

20. The apparatus of claim 1 wherein each tooth of the plurality of teeth comprises a corresponding support member coupled to the shaft, and comprises a corresponding meat-tearing element coupled to the support member.

* * * * *